United States Patent [19]

Fulmer

[11] 4,318,091
[45] Mar. 2, 1982

[54] SELF-RESETTING WARNING ACTUATOR FOR A DUAL CIRCUIT BRAKE SYSTEM

[75] Inventor: Keith H. Fulmer, Mishawaka, Ind.

[73] Assignee: The Bendix Corporation, Southfield, Mich.

[21] Appl. No.: 183,478

[22] Filed: Sep. 2, 1980

[51] Int. Cl.³ ............................................. G08B 21/00
[52] U.S. Cl. ................................ 340/626; 200/82 D; 303/6 C; 340/52 C; 340/605
[58] Field of Search ............ 340/626, 624, 605, 52 C; 200/81.9 M, 82 D, 84 C; 188/1 A, 151 A; 303/6 C

[56] References Cited

U.S. PATENT DOCUMENTS 3,947,648  3/1976  Muterel ..................... 340/52 C X
4,114,145  9/1978  Farr ........................ 340/52 C X Primary Examiner—John W. Caldwell, Sr.
Assistant Examiner—Daniel Myer
Attorney, Agent, or Firm—Paul David Schoenle; Ken C. Decker

[57] ABSTRACT

A self-resetting warning actuator (42) for a vehicle brake system includes a housing (27) having a bore (44) which defines a recess (58). A pair of pressure responsive pistons (50, 54) are received in the housing bore and each is exposed to the pressure in one brake circuit. A roller member (48) is disposed in the housing recess and between the pistons. When the brake system is operating normally, the pressures in the two brake circuits are substantially equal and the pistons define a neutral position. Should one of the circuits fail, the pistons are shifted from their neutral position by the resulting pressure difference between the circuits. The housing recess defines a ramp which forces the roller member between the pistons when the pistons shift from their neutral position. A signaling device, by its response to the movement of the pistons, provides a warning to the vehicle operator. When the brake system is repaired, and the pistons are once again exposed to equal pressures, the roller member is forced from between the pistons. Movement of the roller member along the recess ramp returns the pistons to their neutral position.

7 Claims, 5 Drawing Figures

SELF-RESETTING WARNING ACTUATOR FOR A DUAL CIRCUIT BRAKE SYSTEM

The invention relates to a brake failure warning actuator and more particularly, to a switch actuator arrangement which provides for automatic reset. The actuator includes a housing and a pair of opposed pressure responsive pistons slidably received in a bore of the housing. The housing bore defines a recess in which a roller member is disposed between the pistons. Each piston is exposed at its outer end to the hydraulic pressure in one of the two circuits of a dual circuit vehicle brake system. The inner end of each piston is tapered and cooperates with the roller member. The housing defines a pair of axially-extending ramps on either side of the recess. The pistons define substantially equal areas which are exposed to the hydraulic pressures in the respective brake circuits. Consequently, the pistons are maintained in a neutral position so long as the hydraulic pressures in the two brake circuits are substantially equal because the tapered inner ends of the pistons force the roller member into the housing recess between the ramps.

Should one of the hydraulic circuits fail so that the pressures are no longer equal, one of the pistons is exposed to a greater hydraulic pressure than is the other piston. Consequently, the one piston moves the roller member and the other piston toward the failed hydraulic circuit. As the one piston moves toward the failed circuit, it moves the roller member up one of the ramps defined by the housing. Rolling of the roller member up the ramp causes the roller member to move out of the recess and to move radially inward between the tapered inner ends of the pair of pistons. The one piston moves the roller member and the other piston toward the failed hydraulic circuit until the other piston contacts an abutment defined by the housing. When the other piston contacts the housing abutment it defines a failed position for the pair of pistons and the roller member. Because the roller member moves between the pistons as they move from their neutral position to their failed position, the pistons are spaced further apart in their failed position than they are in their neutral position. A further consequence of the roller member moving between the pair of pistons is that the one piston does not move as far from its neutral position as does the other piston.

When the failed brake circuit is repaired, the pistons are once again subjected to substantially equal hydraulic pressures. Consequently, the hydraulic pressures create substantially equal axial forces on the two pistons. The axial forces on the pair of pistons are opposite in direction and are applied by the inner ends of the pistons to the roller member. The tapered inner ends of the pistons cooperate with the roller member so that the axial forces transferred from the pistons to the roller member are resolved into a radially outward force on the roller member. Because of the radially outward force, the roller member moves down the ramp defined by the housing. The roller member moves the one piston toward its neutral position. Hydraulic pressure in the repaired brake circuit moves the other piston toward its neutral position. The roller member moves from between the pistons as the pistons and roller member return to their neutral positions. When the roller member returns to the recess between the pair of axially-extending ramps, the roller member defines a neutral position for the pair of pistons.

A switch is responsive to movement of the pistons from their neutral position and closes an electrical circuit to activate a signaling device located in the operator's compartment of the vehicle. A brake actuation with one of the brake circuits failed causes the pistons to move to their failed position, activating the signaling device. Because the pistons do not return to their neutral position until they are once again exposed to equal hydraulic pressures, the signaling device remains activated after the end of a braking phase.

In a preferred embodiment of the invention the actuator housing comprises a part of the secondary piston in a dual piston master cylinder. A bore in the secondary piston receives the pair of pressure responsive actuator pistons. The master cylinder carries a switch responsive to movement of the pair of actuator pistons from their neutral position.

A warning actuator is known in accordance with the U.S. Pat. No. 4,114,145 to Farr in which a pair of pressure responsive pistons is exposed to the hydraulic pressures in a pair of brake circuits. The contiguous ends of the pistons cooperate with a lever pivotally carried by a housing which receives the pistons. When the hydraulic pressures in the two brake circuits are equal, the pistons each define an equal lever arm with the lever and the pistons are maintained in a neutral position by the balanced moments on the lever. Should one of the brake circuits fail, the pistons are moved toward the failed circuit and the lever is pivoted so that it defines a lever arm with the piston exposed to the failed circuit which is longer than the lever arm defined with the piston of the operational circuit.

When the failed circuit is repaired, the pistons are once again exposed to equal pressures. The unequal lever arms defined with the pistons create a moment on the lever which returns the pistons to their neutral position.

With an actuator of the kind illustrated in the Farr patent the housing must provide a pivotal connection for the lever. Embodiments having the pivot intermediate of the ends of a common bore which receives the pair of pistons require a housing which is complex and expensive to manufacture. An embodiment having separate bores for the pistons must include structure which is strong enough to support the lever against the combined forces generated by the two pistons. Moreover, an embodiment having separate bores for the two pistons does not lend itself to an incorporation into one of the pistons of a dual circuit master cylinder.

The invention as claimed is intended to remedy the drawbacks of prior actuators by providing a failure actuator which is readily incorporated into a master cylinder and which is comprised of component parts which are uniquely simple and inexpensive to manufacture.

The advantages offered by the invention are mainly that the warning actuator is easily incorporated into a master cylinder; the component parts of the actuator are individually simple to manufacture and are few in number. Moreover, the actuator is easy to assemble, which further reduces its manufacturing cost; and, because of its simplicity, the actuator is very reliable.

Two ways of carrying out the invention are described in detail below with reference to drawings which illustrate only these two specific embodiments, in which.

Figure 1:
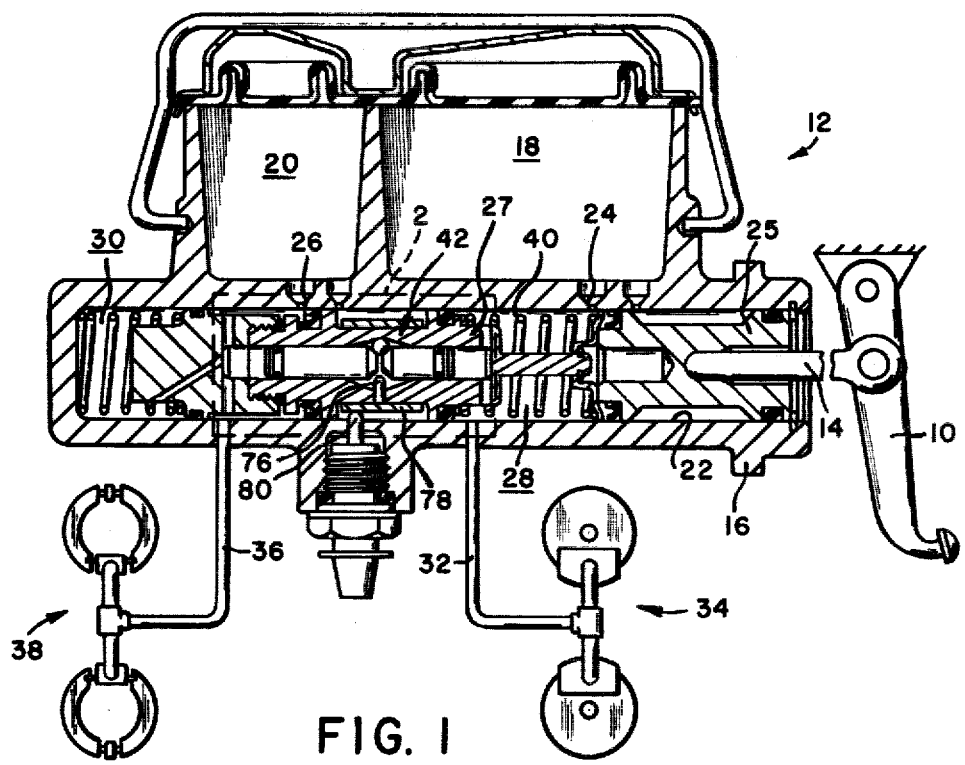
FIG. 1 is a schematic illustration of a brake system showing a warning actuator and a master cylinder partly in cross-section.

In the brake system of FIG. 1, a brake pedal 10 is operable by a vehicle operator to initiate a brake application. The pedal 10 connects with a master cylinder 12 by means of an input rod 14. The master cylinder 12 includes a housing 16 defining a pair of reservoirs 18 and 20 for storing brake fluid. A bore 22 within the housing 16 communicates with the reservoirs by openings 24 and 26. A pair of pistons 25 and 27 are movably disposed within the bore 22 to define a first pressure chamber 28 and a second pressure chamber 30. A conduit 32 conveys fluid pressure from the first pressure chamber to a first brake circuit 34 while a conduit 36 conveys fluid pressure from the second pressure chamber to a second brake circuit 38.

When the input rod 14 is moved to the left during a brake application, fluid trapped within the first pressure chamber is pressurized by movement of the first piston 25 so as to communicate fluid pressure via conduit 32 to the first brake circuit 34. The pressurized fluid within the first pressure chamber 28 and the contraction of a spring 40 cause the second piston 27 to move to the left to trap and pressurize fluid within the second pressure chamber 30. Pressurized fluid in the second pressure chamber is communicated via the conduit 36 to the second brake circuit 38.

In accordance with the invention, a warning actuator 42 cooperates with the master cylinder to generate a signal when a predetermined pressure difference exists between the chambers 28 and 30. In addition, the warning actuator is automatically reset to a neutral position when the pressure differential between the pressure chambers is substantially eliminated.

Figure 2:
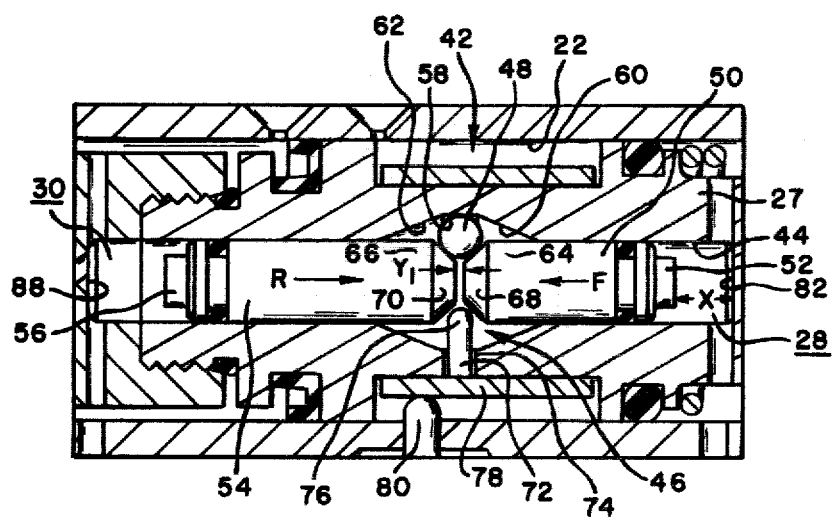
FIG. 2 is an enlarged view of an encircled portion of FIG. 1.

Turning to FIG. 2, the piston 27 sealingly engages the housing bore 22 to separate the first pressure chamber 28 from the second pressure chamber 30. The piston 27 includes a bore 44 opening to the first pressure chamber 28 and to the second pressure chamber 30. The warning actuator 42 comprises a piston assembly 46 movably disposed within the bore 44 and a roller member or ball 48. Piston assembly 46 includes a first piston 50 having an outer end 52 exposed to fluid pressure within the first pressure chamber 28 and a second piston 54 having an outer end 56 exposed to fluid pressure within the second pressure chamber 30. The pistons 50 and 54 each define equal areas exposed to the pressure chambers 28 and 30, respectively. A recess 58 on the bore 44 receives the roller member 48. Piston 27 defines ramps 60 and 62 which extend axially between recess 58 and bore 44. The pistons 50 and 54 include contiguous inner ends 64 and 66 respectively, which engage the roller 48. Each of the inner ends 64 and 66 define a truncated conical surface 68 and 70, respectively, which engage the roller 48. A plunger 72 is shiftably received in a bore 74 in piston 27 and defines a rounded end 76 which engages both of the pistons 50 and 54. The end of plunger 72 remote from end 76 engages a resilient split sleeve 78 which yieldably engages the piston 27. A switch 80 is engageable with the sleeve 78 to control operation of an indicator signal (not shown). When the pressure within each pressure chamber 28 and 30 is substantially equal, the pistons 50 and 54 are equally biased into engagement with the roller 48 to define a neutral position as shown in FIG. 2.

Figure 3:
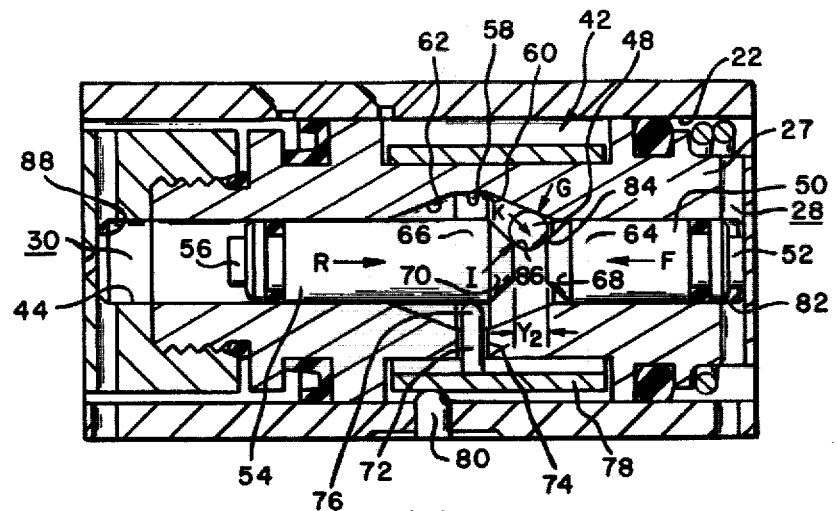
FIG. 3 is an enlarged view similar to FIG. 2 and showing the actuator in a failed position.

If the conduit 32 or brake circuit 34 fails during a brake application, the pressurized fluid within chamber 28 escapes to reduce the pressure level therein. The piston 25 and spring 40 continue to move the piston 27 to a position pressurizing fluid within chamber 30 so that a pressure differential is created between the pressure chambers. As a result, the force R on piston 54 is greater than the force F on piston 50 so that the pistons 50 and 54 and roller member 48 are moved toward an unbalanced, or failed position as shown in FIG. 3. As the piston 54 moves to the right (viewing FIG. 3) away from the neutral position, the roller member 48 is moved to the right away from recess 58 and onto ramp 60. The conical surface 70 of piston 54 defines an angle with the axis of bore 44 which is greater than the angle defined between the ramp 60 and the axis of bore 44. Consequently, the ramp 60 and surface 70 are not parallel. The axis force R on piston 54 is applied to roller 48 as a force I which is perpendicular to the surface 70. A reaction force G acting between ramp 60 and roller member 48 opposes the force I. Force G is perpendicular to the ramp 60. Because the ramp 60 and surface 70 are not parallel, the forces I and G are not parallel and are resolved into a force K on roller member 48. Consequently, the roller member 48 moves axially to the right (viewing FIG. 3) and radially inwardly as piston 54 moves to the right. The force K is transferred to piston 50 at the point of contact 84 between the roller member 48 and piston 50. Force K is resolved into an axial force on piston 50 which is greater than the force F. As a result, piston 50 is moved to the right by roller member 48 as piston 54 moves the roller member to the right and radially inwardly along ramp 60.

In a failed position of the pistons 50 and 54, viewing FIG. 3, the piston 50 abuts a shoulder 82 defined at the right end of bore 44. The abutment of piston 50 with shoulder 82 prevents further rightward movement of the piston 50 so that the piston 50 stops the rightward movement of roller member 48 and of piston 54. Viewing FIG. 2, in its neutral position, the piston 50 defines a clearance X with shoulder 82. Piston 50 also defines a clearance Y1 with piston 54. In moving from its neutral to its failed position, the piston 50 moves through the clearance X. Referring again to FIG. 3, it will be seen that the roller member 48 moves between the pistons 50 and 54 as the roller member moves radially inward on ramp 60. Consequently, the piston 50 defines a clearance Y2 with piston 54 when the pistons are in their failed position. The clearance Y2 is greater than the clearance Y1. Because the piston 50 moves the distance X between its neutral and failed positions, while the piston 54 moves only the distance X minus the difference between clearances Y2 and Y1, the piston 54 moves through a smaller distance than does the piston 50. Consequently, the volume of chamber 30 is increased to a smaller degree than the decrease of volume in chamber 28. Therefore, the pressure level of the pressurized fluid within chamber 30 will be only slightly decreased by the increased volume of chamber 30 when the piston 54 moves to the right. As the pistons 54 and 50 move to the right, the plunger 72 is moved downward by the conical surface 70 of piston 54 and urges the sleeve 78 to move radially outward. The outward movement of the sleeve 78 moves the switch 80 to actuate the indictor signal. The end 76 of plunger 72 rests upon the cylindrical outer surface of piston 54 to the left of the inner end 66 so that the switch 80 remains activated after the brake application is ended.

If the failure in brake circuit 34 is repaired, a brake application causes the fluid trapped within each pressure chamber 28 and 30 to be pressurized to substantially the same pressure levels. With the piston assembly 46 and roller member 48 in the unbalanced position of FIG. 3, the pressure acting against piston 50 creates a force F which is substantially equal to the force R created by the pressure acting against piston 54. The forces F and R are applied to roller 48 at points 84 and 86 respectively. The points 84 and 86 lie below the center of roller 48 so that the roller tends to move upward. The upward force on roller 48 causes it to roll up the ramp 60. Roller 48 moves piston 54 to the left in FIG. 3 and piston 50 is moved to the left by the pressure in chamber 28 until the pistons 50, 54 return to their neutral position and the roller 48 is in the uppermost part of recess 58 between the ramps 60 and 62. At the neutral position, the forces F and R acting against the roller member 48 create no forces to the left or right because the roller 48 is between the ramps 60 and 62.

The pistons 50 and 54 sealingly engage the bore 44. Consequently, the roller member disposed between the pistons 50 and 54 is isolated from the pressure chambers 28 and 30 to operate independently thereof.

If the conduit 36 or brake circuit 38 should fail, the pistons 50 and 54 and roller member 48 are movable to the left, thereby actuating the warning switch in a manner similar to that described above. When moved to the left, the piston 54 abuts a shoulder 88 at the left end of bore 44. Moreover, the roller member and pistons are returnable to the neutral position when the failure is repaired.

Although the warning actuator 42 is shown within the piston 27, it is possible to locate the actuator 42 anywhere provided the piston 50 is exposed to pressure within the chamber 28 and the piston 54 is exposed to pressure within the chamber 30.

Figure 4:
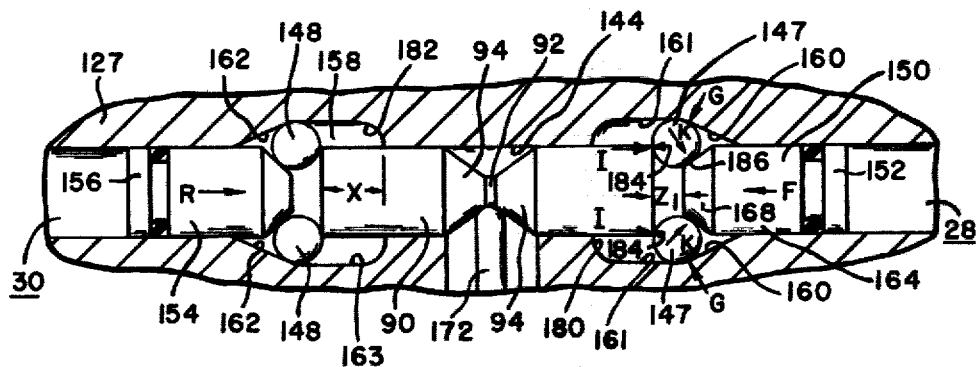
FIG. 4 is a view similar to FIG. 2 showing an alternative embodiment of the actuator.
Figure 5:
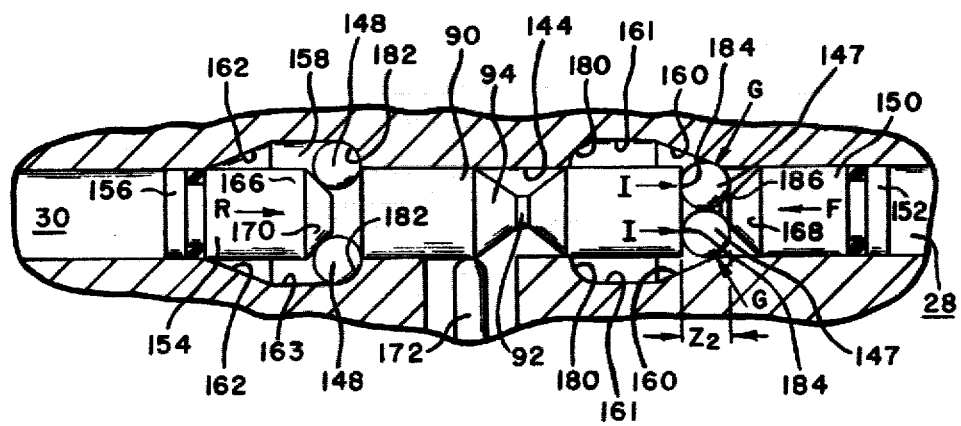
FIG. 5 is a view of the embodiment of FIG. 4 in a failed position.

In the alternative embodiment illustrated by FIGS. 4 and 5, the pistons 150 and 154 are shiftably received in a bore 144 of a housing 127. The bore 144 defines a pair of recesses 158, respective ramps 160 and 162, recess portions 161 and 163, and abutments 180 and 182. Recess portions 161 and 163 extend axially and substantially parallel to the axis of bore 144. Each of the recesses 158 receives roller members, or balls 147, 148. The pistons 150, 154 include outer ends 152, 156 and inner ends 164 and 166 respectively. The piston inner ends 164 and 166 define conical surfaces 168 and 170 which engage the rollers 147, 148. The rollers in turn engage a spacer 90 which includes a reduced diameter portion 92 which cooperates with the spacer to define conical shoulders 94. A plunger 172 engages the reduced diameter portion 92 so that movement of the spacer 90 to the left or right actuates a switch, as explained with regard to the FIG. 1 embodiment. With the assembly in the position illustrated by FIG. 4, the rollers 147, 148 rest at the transition between the axially-extending recess portions 161, 163 and ramps 160, 162 to define a neutral position for the assembly. During a brake application, the pressures in chambers 28 and 30 are substantially equal and create balanced forces F and R on pistons 150 and 154, respectively.

If the brake circuit associated with chamber 28 fails, chamber 28 is at a reduced relative to the chamber 30 during a brake application. Consequently, the fluid pressure creates a force R on piston 154 which is greater than the force F and which moves piston 154. Piston 154 moves rollers 148 to the right along the axially-extending portion 163 of the left-hand recess 158, viewing FIG. 5. The rollers 148 move the spacer 90 to the right until the rollers 148 contact abutments 182. Movement of spacer 90 to the right actuates a switch via plunger 172 and moves the rollers 147, which are adjacent to piston 150, radially inwardly down the ramps 160. The rightward force R transferred from piston 154 to spacer 90 via the rollers 148 is applied as forces I to the rollers 147 at points 184 and is opposed by reaction forces G, as was explained with regard to the embodiment of the invention illustrated by FIGS. 1-3. Consequently, the rollers 147 move radially inward as they move axially to the right down ramps 160. The resultant forces K on rollers 147 are applied to piston 150 at surface 168. Forces K are resolved into an axial force which is greater than the force F so that piston 150 is moved rightward as the rollers 147 move rightward and radially inwardly.

In the neutral position, the piston 150 defines a clearance Z1 with spacer 90, viewing FIG. 4. Viewing FIG. 5, the piston 150 defines a clearance Z2 with the spacer in the failed position. Clearance Z2 is larger than clearance Z1. Referring again to FIG. 4, it will be seen that the piston 154, rollers 148 and spacer 90 move the distance X between the neutral and failed positions. Piston 150 moves the distance X plus the difference between clearances Z2 and Z1 when it moves between its neutral and its failed positions. Consequently, the piston 154 moves a shorter distance than does the piston 150. As was explained with regard to the embodiment illustrated by FIGS. 1-3, the pressurized fluid in chamber 30 is not significantly affected by the increasing volume of the chamber 30 when the piston 154 moves to the right.

When the failure associated with chamber 28 is repaired, the balanced forces F and R act through the pistons 150, 154, spacer 90 and rollers 147, 148. The force F is applied to rollers 147 at points 186, viewing FIG. 5. Rollers 147 are also subjected to the force R, which is represented by forces I. Forces I are applied to rollers 147 at points 184. Because the points 186 lie closer to the axis of bore 144 than does the center of rollers 147, the rollers are forced radially outwardly. Reaction forces G oppose the radially outward forces on rollers 147. Forces G are resolved into an axial force directed to the left viewing the Figure, which returns the actuator to its neutral position. Because the rollers 148 are disposed upon the axially-extending portion of the left-hand recess 158, the rollers 148 produce no axial forces. When the actuator assembly reaches its neutral position, viewing FIG. 4, the rollers 147 and 148 are disposed at the transition between ramps 160, 162 and the axially-extending recess portions 161, 163, so that all of the axial forces on the actuator are balanced.

Should the brake circuit associated with chamber 30 fail, the actuator is movable to the left, thereby actuating the warning switch in a manner similar to that described above.

I claim:

1. A self resetting warning actuator comprising:
a housing defining a bore therein, said housing further defining a recess on said bore and an axially-extending ramp between said recess and said bore;

a pair of pressure responsive piston means slidably received in said bore for cooperating with said housing to define a pair of pressure chambers, said piston means moving from a neutral position to a failed position responsive to a pressure differential between said pressure chambers, each of said piston means having an inner end contiguous to the other piston means;

a roller member engaging the inner ends of said piston means, said roller member moving between a first location in which said roller member is received in said recess and cooperates with said pair of piston means to define said neutral position, and said roller member moving to a second location responsive to movement of said piston means to said failed position, said roller member in said second location being spaced from said recess and moving radially inwardly on said ramp and between said pair of piston means; and means responsive to the movement of said piston means to the failed position for providing a signal.

2. The invention of claim 1 wherein the inner end of one of said piston means defines a conical surface.

3. The invention of claim 1 wherein one of said piston means includes an elongated spacer disposed adjacent to the other piston means and shiftable in said housing bore, said housing recess being disposed at the one end of said spacer, said roller member engaging an end of said spacer, whereby said spacer is shiftable in said bore responsive to the movement of said piston means between the neutral and failed positions.

4. The invention of claim 2 wherein the conical surface of said one piston means defines an angle with the axis of said bore which is greater than the angle defined between the axially-extending ramp and the axis of said bore.

5. The invention of claim 4 wherein the inner end of the other piston means defines a conical surface and said roller member engages the inner ends of both of said piston means, said roller member cooperating with the conical surfaces of said piston means and with said axially-extending ramp whereby substantially equal fluid pressures in said pressure chambers acting on said piston means force said roller member from between said piston means and into said recess, said one piston means being responsive to a pressure differential between said pressure chambers to move away from the pressure chamber having the higher pressure, said one piston moving said roller member from said recess and along said axially-extending ramp, said axially-extending ramp moving said roller member radially inwardly and between said pair of piston means, and said roller member moving the other of said piston means toward the pressure chamber having the lower pressure.

6. The invention of claim 3 wherein said recess includes an axially-extending portion which is substantially parallel to the axis of said bore, whereby said roller member is axially movable in said recess responsive to movement of said piston means between the neutral position and the failed position, said roller member moving axially within said recess while maintaining substantially a constant distance between the roller member and the axis of said bore.

7. A warning actuator having a housing defining a first chamber communicating with a first hydraulic circuit and a second chamber communicating with a second hydraulic circuit, a first piston exposed to the pressure within the first chamber and a second piston exposed to the pressure within the second chamber, the first and second pistons being movable within said housing from a neutral position to an unbalanced position in response to a pressure differential between the first and second chambers, a roller member received in a recess of said housing, said roller member being responsive to the movement of the first and second pistons to an unbalanced position to move along a ramp defined by said housing to interpose between said first and said second pistons to move one of said first and second pistons a greater distance than the other piston, means responsive to the movement of said first and second pistons to the unbalanced position for producing a signal.

* * * * *